(12) United States Patent
Guercioni

(10) Patent No.: US 8,922,078 B2
(45) Date of Patent: Dec. 30, 2014

(54) STATOR FOR AN ELECTRIC MACHINE

(75) Inventor: Sante Guercioni, Martinsicuro (IT)

(73) Assignee: Tecnomatic S.p.A., Teramo, Corropoli (IT)

( * ) Notice: Subject to any disclaimer, the term of this patent is extended or adjusted under 35 U.S.C. 154(b) by 0 days.

(21) Appl. No.: 13/639,091

(22) PCT Filed: Jul. 7, 2011

(86) PCT No.: PCT/IT2011/000231
§ 371 (c)(1),
(2), (4) Date: Oct. 2, 2012

(87) PCT Pub. No.: WO2013/005238
PCT Pub. Date: Jan. 10, 2013

(65) Prior Publication Data
US 2014/0210286 A1    Jul. 31, 2014

(51) Int. Cl.
*H02K 3/28* (2006.01)
*H02K 3/12* (2006.01)

(52) U.S. Cl.
CPC ... *H02K 3/28* (2013.01); *H02K 3/12* (2013.01)
USPC .......................................................... 310/71

(58) Field of Classification Search
CPC ........... H02K 5/225; H02K 3/50; H02K 3/12; H02K 3/28
USPC .......................................................... 310/71
See application file for complete search history.

(56) References Cited

U.S. PATENT DOCUMENTS

| | | | | |
|---|---|---|---|---|
| 4,039,875 A | * | 8/1977 | Morreale | 310/194 |
| 5,231,324 A | * | 7/1993 | Kawamura et al. | 310/198 |
| 6,049,154 A | * | 4/2000 | Asao et al. | 310/201 |
| 6,285,105 B1 | * | 9/2001 | Asao et al. | 310/208 |
| 6,459,187 B1 | | 10/2002 | Oohashi et al. | |
| 6,624,544 B2 | * | 9/2003 | Higashino et al. | 310/201 |
| 6,661,146 B2 | * | 12/2003 | Oohashi et al. | 310/180 |
| 6,717,317 B2 | * | 4/2004 | Akita et al. | 310/184 |
| 6,862,797 B2 | * | 3/2005 | Neet | 29/596 |
| 6,894,417 B2 | * | 5/2005 | Cai et al. | 310/198 |
| 7,170,211 B2 | * | 1/2007 | Chen et al. | 310/207 |

(Continued)

FOREIGN PATENT DOCUMENTS

FR      2 841 701      1/2004

OTHER PUBLICATIONS

International Search Report and Written Opinion of the International Searching Authority of Application No. PCT/IT2011/000231, mailed May 25, 2012.

*Primary Examiner* — Alex W Mok
(74) *Attorney, Agent, or Firm* — Ropes & Gray LLP

(57) ABSTRACT

A stator for an electric machine includes a stator core having a first and a second face and a circular row of stator slots extended between said faces and which are distributed around a stator axis; and, a winding bar comprising a plurality of basic conductors and a plurality of special conductors interconnected with one another to form the bar winding. The basic conductors each comprise two basic conductor legs and a connecting portion of basic conductor between said legs. The basic conductors are inserted into the stator slots with the free end portions protruding from said second face. The special conductors comprise a jumper of a first type having a first and a second leg of jumpers connected respectively to two of said free end portions, and one jumper connection portion between said legs of jumpers.

8 Claims, 5 Drawing Sheets

(56) References Cited

U.S. PATENT DOCUMENTS

| | | | |
|---|---|---|---|
| 7,679,253 B2 * | 3/2010 | Neet | 310/208 |
| 2008/0042508 A1 * | 2/2008 | Cai | 310/198 |
| 2008/0079328 A1 | 4/2008 | Shichijoh et al. | |
| 2009/0179530 A1 * | 7/2009 | Neet | 310/68 D |

* cited by examiner

STATOR FOR AN ELECTRIC MACHINE

CROSS REFERENCE TO RELATED APPLICATIONS

This application is a U.S. National Stage Application under 35U.S.C. §371 of International Application No. PCT/IT2011/000231, filed Jul. 7, 2011, the entire contents of which is incorporated herein by reference in its entirety.

DESCRIPTION

This description relates to a stator for an electric machine.

The use of electric machine stators, such as generators or electric motors, for example for applications in hybrid electric vehicles (HEVs) is well known, whereby the stator winding is formed by a plurality of bent bar conductors, variously interconnected with one another so as to form the so-called bar windings.

In particular, bar windings made of electrical bar conductors having a rectangular cross section, where rectangular means both the square section and the "flat" section, which generally indicates a rectangular-shaped section in which two sides of the section are smaller than the other two, belong to the prior art.

Typically, the bar conductors that form bar windings in the prior art include a plurality of so-called "basic" conductors and a plurality of so-called "special" conductors, such as phase terminals, jumpers, neutral connections, star centers, etc., namely conductors required for the completion of the winding.

Basic conductors are usually preformed by "U" or "P" bending, starting from linear bar conductors. United States patent U.S. Pat. No. 7,480,987 describes an exemplary method for pre-forming bar conductors (called "hairpin conductors" in this document).

"U" or "P" preformed conductors, often also called "basic preformed conductors" in the technical field, typically have two adjacent legs, of different length, each provided with an end portion joined, by means of a joining portion, to the other leg and an opposite free end portion.

For example, in order to make a stator, the known technique is to carry out two different types of twisting on the "U" or "P"-shaped preformed conductors.

In a first type of twisting, also known as "twisting from the insertion side", the basic preformed conductors are appropriately inserted in the corresponding radially aligned pockets part of a twisting device, which will deform said conductors after insertion. The twisting device is essentially used to "spread apart" the legs of the "U" or "P" shape so that both legs of a same conductor, after the latter has been extracted from the twisting device, may be then inserted into a stator core's slots, which are radially offset from each other by a predetermined pitch.

Published patent application US 2009/0178270 describes an exemplary "insertion side" twisting method for uniform-pitch twisting of preformed bar conductors after their insertion into the pockets of a twisting device.

After undergoing the first type of twisting, the bar conductors are inserted into the stator core's slots through a first side of same (the so-called "insertion side" or "insertion face") with the respective free end portions protruding from a second side of the core (the so-called "welding side" or "connection side" or "welding face"), which is opposite to the first side.

The free end portions protruding from the welding side are then subjected to a second type of twisting, also known as "welding side twisting", for example after being inserted into the pockets of an appropriate twisting device. The twisting device's purpose is to bend ("twist") the free end portions of the conductors in order to adequately shape such end portions and therefore implement the appropriate electrical connections between the conductors, in order to complete the winding.

Published US patent application 2009/0302705 describes an exemplary welding side twisting method of above said type. The method described in said patent application allows at one time the non-uniform twisting of free end portions of the bar conductors.

In prior art bar winding stators, the free end portions of the basic conductors that protrude from the welding side normally define a plurality of circular conductor layers, each concentric and including a layer of the radially outer end and a layer of radially inner ends with respect to the central axis of the stator.

In prior art stator bar windings, for various reasons, the need was felt to limit the axial dimensions of the bar winding part protruding from the insertion side and from the welding side of the stator core as much as possible. For example, especially in electric or hybrid vehicle applications, the electric machine of which the stator is a part is normally housed in a relatively narrow space. The stator in particular is normally housed in a space with fixed dimensions set by external constraints. Only the phase terminals normally protrude from said housing so that the appropriate connections to an external load or to an external power source can be made, depending on whether the electric machine functions as a motor or as a generator. With said housing of the same size, the current trend is to increase the axial extension of the stator core as much as possible so as to increase the performance of the electric machine of which the stator is a part. Therefore, the trend is to reduce the axial dimensions of the bar winding parts that protrude axially from the stator core as much as possible (except for the phase terminals, which can protrude outside said housing).

A drawback that is encountered in prior art stators resides in the fact that, in order to have bar winding with reduced axial dimension as discussed above, the possibility of joining the free end portions of the bar conductors protruding from the welding side are relatively limited. In fact, prior art solutions that maintained a limited axial dimensions of the stator consist essentially in welding two free end portions radially adjacent to the axis of the stator together and in connecting between them, by means of special conductors such as jumpers or star centers, two or more free end portions of the radially outer ends layer (or the radially inner ends layer), which are circumferentially spaced from each other by a given amount. The fact that there are only limited possibilities to join the bar connectors consequently creates constraints that make the management of welding side joining not very flexible and in general make bar winding design less flexible, and hence more difficult.

This description aims to provide a stator for an electric machine that allows to at least in part obviate the drawbacks discussed above in relation to the prior art.

According to one aspect of the invention, an objective of this description is to provide a stator with bar winding for an electric machine that will allow a more flexible management of the joining between the winding connectors compared to prior art stators and that will at the same time preserve the axial compactness of the winding parts that project axially beyond the stator core.

These and other objectives are achieved through a stator as defined in the annexed first claim in its most general form and in the dependent claims in some particular embodiments.

A further aim of this invention is to provide an electric machine and an electric or hybrid vehicle.

The invention will be more clearly understood from the following detailed description of some exemplary embodiments, which are illustrated by, and therefore in no way limited by the annexed drawings, wherein.

In the annexed figures, same or similar elements will be indicated by the same numeral references.

For the purposes of this description, a "flat" or "square" bar conductor indicates a bar conductor having four essentially flat sides, each joined to adjacent sides, typically by a rounded edge.

Therefore, the words "flat" or "square" or equivalent terms, used to describe the cross section of a bar conductor, are used in a general sense, and should not be interpreted to exclude the fact that such bar conductors have significantly rounded edges joining the substantially flat sides. The term "flat conductor" is to be regarded as meaning that the conductor has two opposite sides, their mutual distance greater than the distance between the remaining two opposite sides. For the purposes of this description, the term "rectangular conductor" is to be regarded as a generalization of a flat and square conductor, since the square conductor is a special case of a rectangular conductor, where the four sides have the same size.

Figure 1:
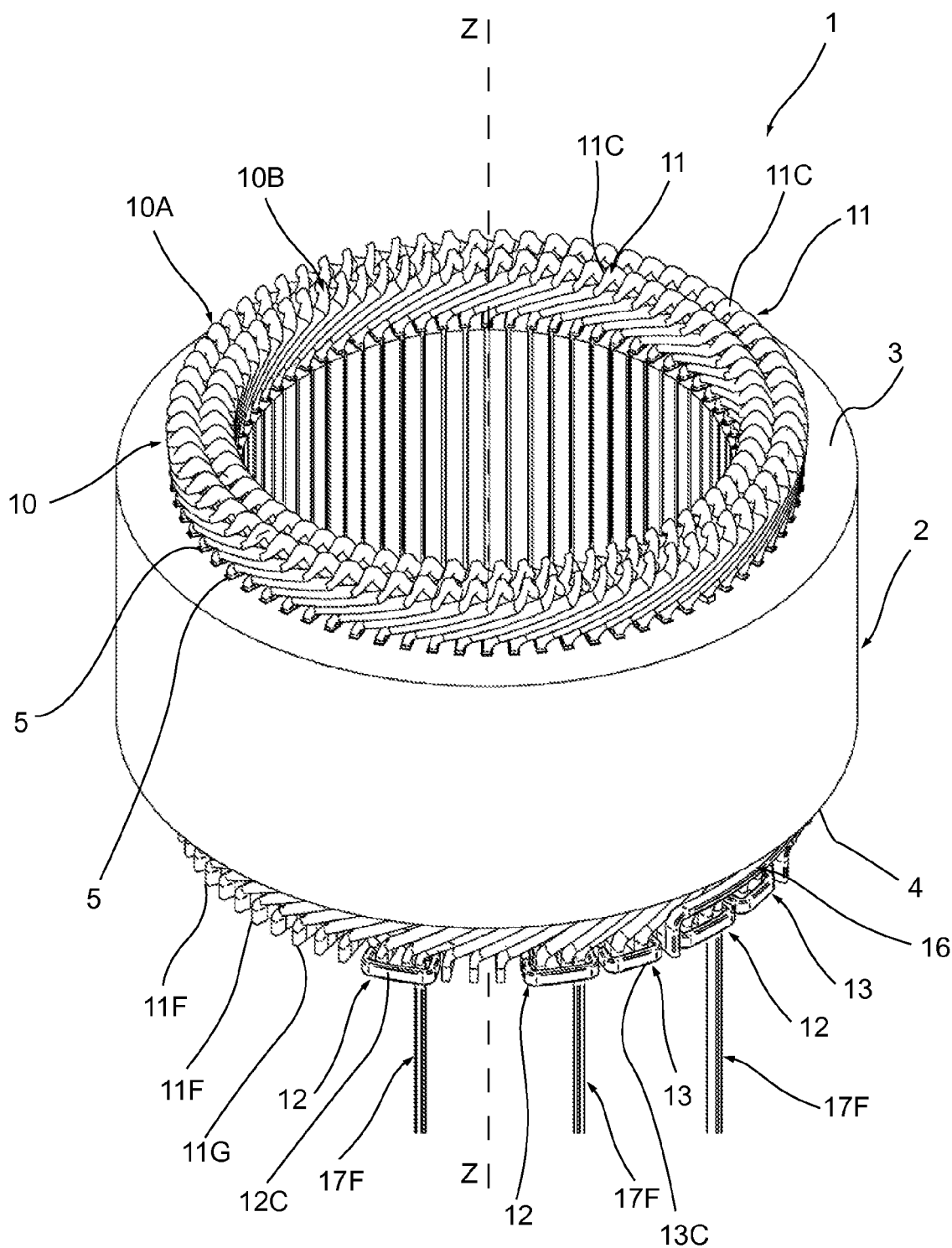
FIG. 1 shows a perspective view of a stator for an electric machine according to a currently preferred embodiment.
Figure 2:
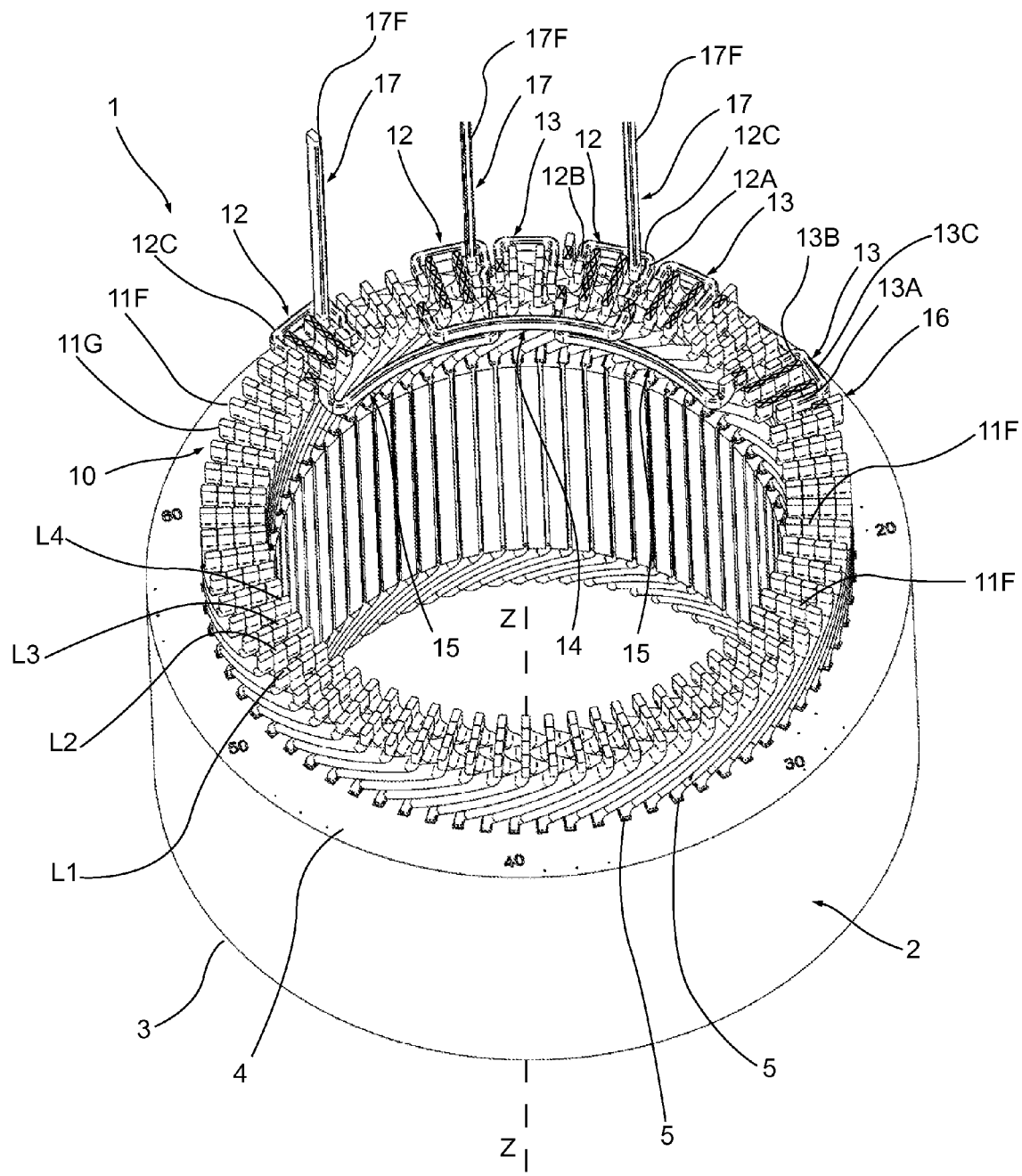
FIG. 2 shows a perspective view of the stator in FIG. 1, where the opposite side of the stator than that shown in FIG. 1 is shown.
Figure 3:
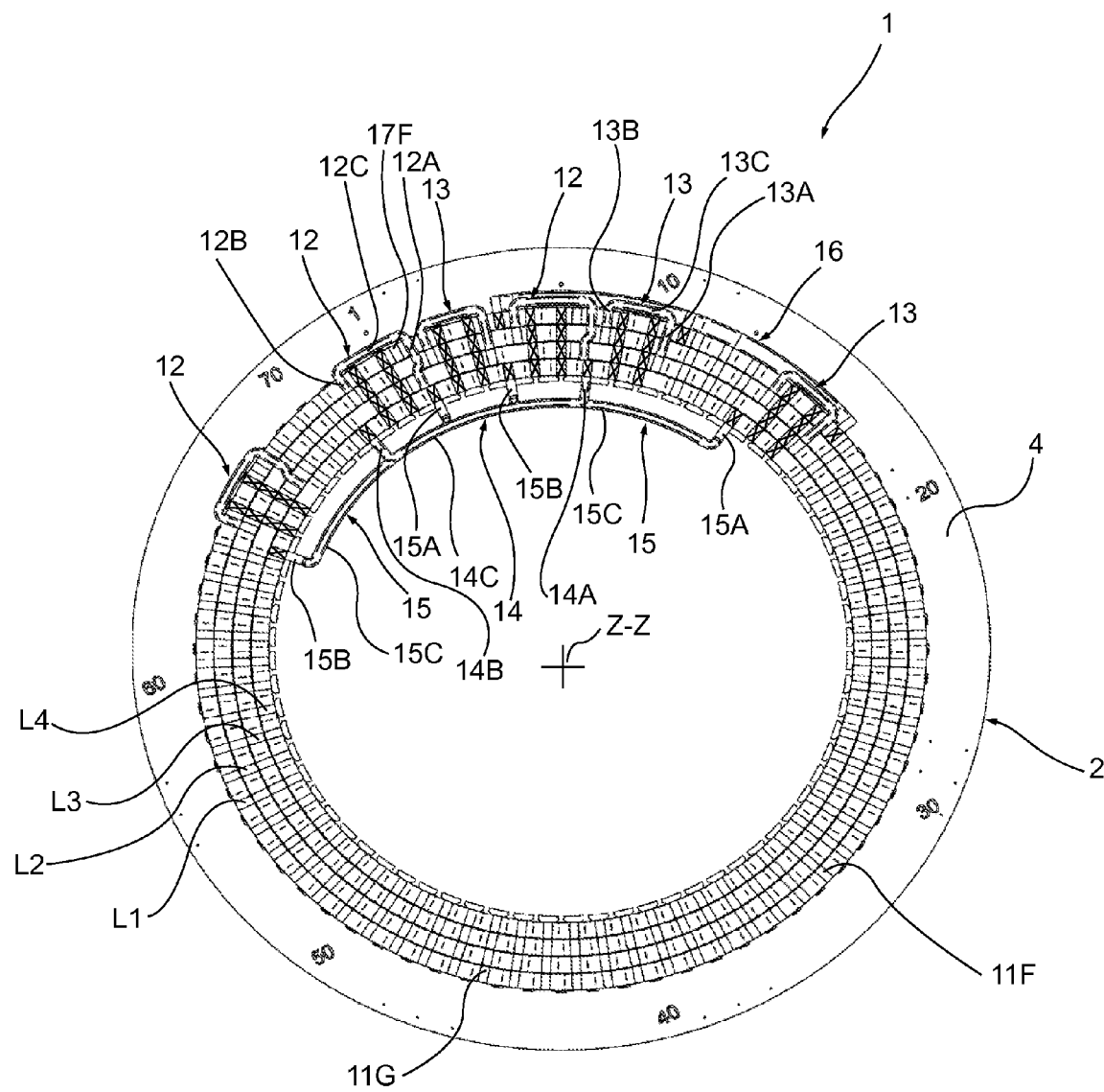
FIG. 3 is a top plan view of the stator in FIG. 1, seen from the side of FIG. 2.

Initially referring to FIGS. 1-3, 1 globally indicates a stator according to a currently preferred embodiment. In the example, though this is not limiting, stator 1 is a three-phase star-shaped stator, with eight poles and 60 kW of nominal power. For example, stator 1 is the stator of an electric machine such as an electric motor, for example for an electric or hybrid vehicle. For example, a stator according to this description may also be used for electric type servos in an electric or hybrid vehicle, for example for a water pump or an oil pump.

It is clear that stator 1 can also be used in an electric machine used as a generator or used to alternately function as motor and as generator. The annexed figures only show the stator of this electric machine as we believe that the remaining parts of an electric machine or of an electric or hybrid vehicle in general will be amply known to a sector expert.

In order to keep the description simple and short, a rotor will not be described in detail here because it is believed that a sector expert, who will be well acquainted with the structure of a rotor, will easily be able to implement the applications explained in this description to a rotor.

Again with reference to FIGS. 1-3, the stator 1 comprises a stator core 2. As can be seen in the figures, according to one embodiment in a per se known way, the stator core 2 comprises a lamellar tubular main body, generally of cylindrical shape, for example made from magnetic material, which extends around a stator axis Z-Z (in FIG. 3 the stator axis Z-Z is orthogonal to the plane of the figure and is indicated schematically by a cross). Preferably, the stator axis Z-Z coincides with the central axis of symmetry of the main body of the stator core 2. The main body of the stator core 2 extends axially (axis Z-Z) between a first and a second face 3, 4 opposite to each other, which are called, respectively, insertion face 3 and welding face 4. It should be noted that for the purposes of this description, the terms "axial", "radial" and "circumferential" are to be understood as referring to the stator axis Z-Z. More particularly, the terms "radial" and "circumferential" are to be understood as references to a virtual circumference lying on an orthogonal plane to the stator axis Z-Z and having their respective center on the stator axis Z-Z.

The main body of the stator core 2 comprises a circular array of slots 5 which extend between the faces 3, 4 and which are distributed around the stator axis Z-Z. In the example, the main body of the stator core 2 comprises, but is not limited to, seventy-two slots 5 which extend axially along the width of the main body and that are evenly angularly spaced around the stator axis z-z.

As can be seen in the figures, the stator 1 includes a bar winding that was generally indicated with 10. According to one embodiment the winding 10 comprises a plurality of basic conductors 11 and a plurality of special conductors 12, 13, 14, 15, 16, 17 which are interconnected to form the bar winding 10. As is known, these last bar conductors 12-17 are so-called "special" elements or conductors, intended for the completion of the winding 10. In this regard please note that in this description, the expression "basic conductors" is used exclusively to identify conductors that are not elements or conductors of the special type described above, i.e., that they are not specially intended for functional completion of the winding.

According to one embodiment, the aforesaid bar conductors 11-17 are copper conductors and are rectangular conductors, and more preferably flat conductors, as they show a pair of opposite faces which are further between them than the remaining two opposite faces are between them.

According to one embodiment, the winding 10 comprises two concentric winding sets 10A, 10B, which are interconnected with each other. As can be seen in FIG. 1, the winding sets 10A, 10B in the example have an essentially circular shape and each comprise a plurality of basic conductors 11. It should be noted, however, that in general the winding 10 may comprise a number of concentric winding sets other than two, for example, a number of winding sets less than or greater than two, depending on the technical specifications required for the winding 10.

According to one embodiment the special conductors comprise a plurality of bridge 12, 13, 14, 15, or jumper conductors 12, 13, 14, 15, a plurality of phase terminals 17 and a neutral connection 16, or star center 16. Clearly, however, the number and the type of special conductors employed, as well as the number of basic conductors, will in general vary depending on the specific winding to be achieved.

Figures 4A, 4B:
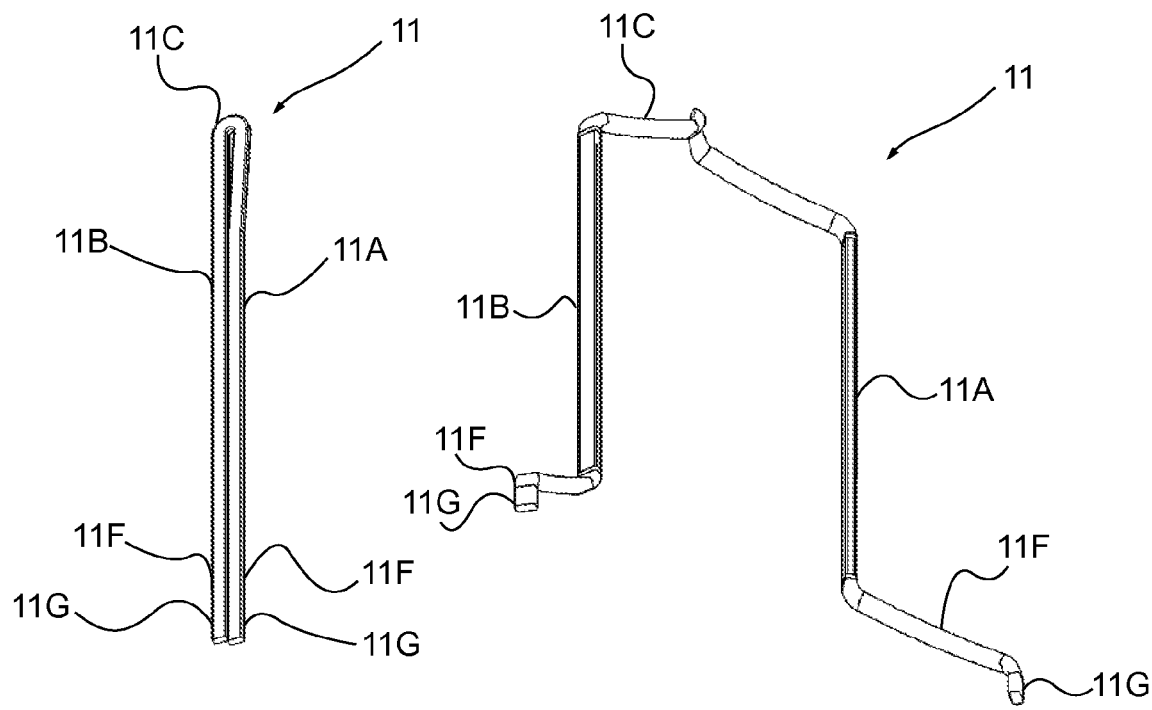
FIGS. 4A-4B are perspective views (view 4A in particular is a near-frontal view) of an embodiment of a basic bar conductor shown respectively in two different configurations.

FIGS. 4A and 4B show one embodiment of a basic conductor 11 respectively in two different configurations. In particular in FIG. 4A, the basic conductor 11 is shown in the respective preformed configuration, basically "P"-shaped. In this configuration, the conductor 11 is also often referred to as "basic preformed conductor". In FIG. 4B, the basic conductor 11 is shown in essentially its final configuration in the stator 1 (i.e., the configuration in FIGS. 1-3), after having been subjected, for example, to twisting on the insertion side and on the welding side. As can be seen in FIGS. 4A and 4B, the basic conductors 11 each comprise two basic conductor legs 11A, 11B and a connecting basic conductor portion 11C (in the field also referred to as "head portion") between the legs 11A, 11B. Each leg 11A, 11B has an end portion connected to the connecting portion 11C and an opposite free end portion 11F.

Figures 9, 10:
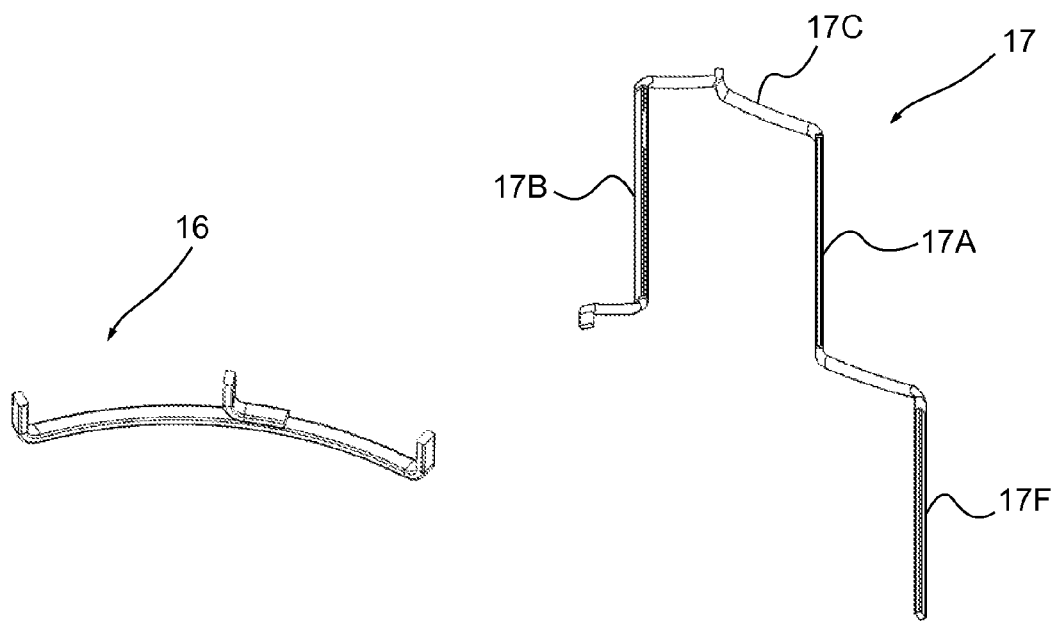
FIG. 9 is a perspective view of one embodiment of a further type of special conductor, a star center or neutral connection conductor in particular.
FIG. 10 is a perspective view of one embodiment of a further type of special conductor, a phase terminal in particular.

In this regard, with reference to FIG. 10, note that this figure shows one embodiment of a phase terminal 17 in its essentially final configuration in the stator 1 (namely in the configuration shown in FIGS. 1-3 in the example). In particular, it can be observed that the phase terminal 17 also comprises a first and a second terminal leg 17A, 17B and a connecting terminal portion 17C between these legs 17A, 17B. More specifically, the leg of the terminal 17A, i.e., the longer terminal leg of legs 17A and 17B, shows an end portion connected to the terminal connection portion 17C and an opposite free end portion of terminal 17F. The essentially final configuration of the phase terminal 17 illustrated in FIG. 10, is obtained in the example starting from an initial configuration of this terminal similar to that of the basic conductor 11 illustrated in FIG. 4A, but in which the difference in length between the legs 17A and 17B is significantly greater than the difference in length between the legs 11A and 11B of the basic preformed conductor 11 in FIG. 4A. The configuration in FIG. 10 can, for example, be obtained by subjecting the terminal 17 to twisting on the insertion side and a twisting on the welding side from the respective initial configuration mentioned above.

With reference to FIG. 2, it can be observed that the basic conductors 11 are inserted into the stator slots 5 with the free end portions 11F protruding from the welding face 4. The end portions 11F define a plurality of circular conductor layers L1, L2, L3, L4 concentric between them. These conductor layers L1, L2, L3, L4, in the example four layers L1, L2, L3, L4, comprise a circular radially outer ends layer L1 and a circular radially inner ends layer L4.

According to one embodiment, the above-mentioned conductor layers L1-L4 comprise, in succession and starting from the radially outer ends layer L1 through to the radially inner ends layer L4, a first L1, a second L2, a third L3 and a fourth L4 circular conductor layer.

According to one embodiment, the conductor layers L1-L4 include a first set of free end portions 11F bent at a first pitch and a second set of portions of free ends 11F bent at a second pitch, different from the first pitch. According to one embodiment, each of the layers L1, L2, L3, L4 includes free end portions 11F bent at the first pitch and end portions 11F bent at the second pitch.

In FIGS. 2 and 3, to distinguish the free end portions 11F bent at the first pitch from those bent at the second pitch, the free end portions 11F bent at the first pitch are marked with "X" on the respective rectangular end surfaces. Please also note that, for the purposes of this description, the expressions "bent at a first pitch" and "bent at a second pitch" referring to the free end portions 11F, are to be understood in the sense that these end portions are bent so as to extend in the circumferential direction for a given number of slots or for a given angle around the stator axis Z-Z. In this example, though without introducing any limitation, the end portions 11F of the said first set (that is, the portions bent at the first pitch and marked with the "X" in FIGS. 2 and 3) extend for a 20° angle around the stator axis Z-Z, corresponding in particular to an extension along four stator slots 5 consecutive between them. The end portions 11F of the second set (i.e., those bent at the second pitch and not marked with "X") instead, extend up to an angle of 22.5° around the stator axis Z-Z, corresponding in particular to an extension along four slots and a half. In other words, in the example the free end portions 11F of the first set are bent at a first pitch while the free end portions 11F of the second set are bent at a second pitch that is greater than the first pitch. In accordance with a preferred embodiment, the end portions 11F can be bent at the first and second pitch via twisting equipment and/or a twisting method as described in patent application number PCT/IT2011/000004, which is currently under a secrecy order regime.

According to one embodiment the free end portions 11F of two adjacent layers L1-L4 are bent circumferentially in opposite directions to each other. In particular in the example, the end portions 11F of layers L1 and L3 are bent in a given direction around the stator axis Z-Z, whereas the end portions 11F of layers L2 and L4 are bent around the stator axis in an opposite direction compared to the above-mentioned given direction. As is known, the free end portions 11F are bent circumferentially so that the terminal parts 11G of the free end portions 11F can be arranged in prearranged positions around the stator axis Z-Z in order to implement the appropriate electric connections between the conductors of the winding 10.

According to a preferred embodiment, the special conductors 12-17 comprise a plurality of jumpers of a first type 12, 13 and a plurality of jumpers of a second type 14, 15. It should be noted, however, that in accordance with a further less preferred embodiment (not shown in the figures), the jumpers of the second type 14, 15 could also not be implemented.

As is known, the jumpers are generally bridge elements or conductors typically used to connect two basic bar conductors of the bar winding together so as to provide electric connections for example between poles, phases, winding sets, etc. In particular, as can be seen from the accompanying figures, each jumper of the first type 12, 13 and each jumper of the second type 14, 15 connects two free end portions 11F between them, and more preferably two of the above terminal parts 11G, which are radially offset from one another and which belong respectively to two distinct basic conductors 11. The main difference between the jumpers of the first and second type resides in the fact that each jumper of the first type 12, 13 connects two free end portions 11F between them, belonging to two of the layers L1-L4 that are mutually distinct, while each jumper of the second type 14, 15 connects two free end portions 11F between them, belonging to a same layer of the conductors layers L1-L4. As can be seen for example in FIGS. 2 and 3, according to one embodiment the jumpers of the first type 12, 13 are generally smaller than the jumpers of the second type 14, 15. For this reason the jumpers of the first type are in that case also referred to as "mini jumpers".

Figures 5, 6:
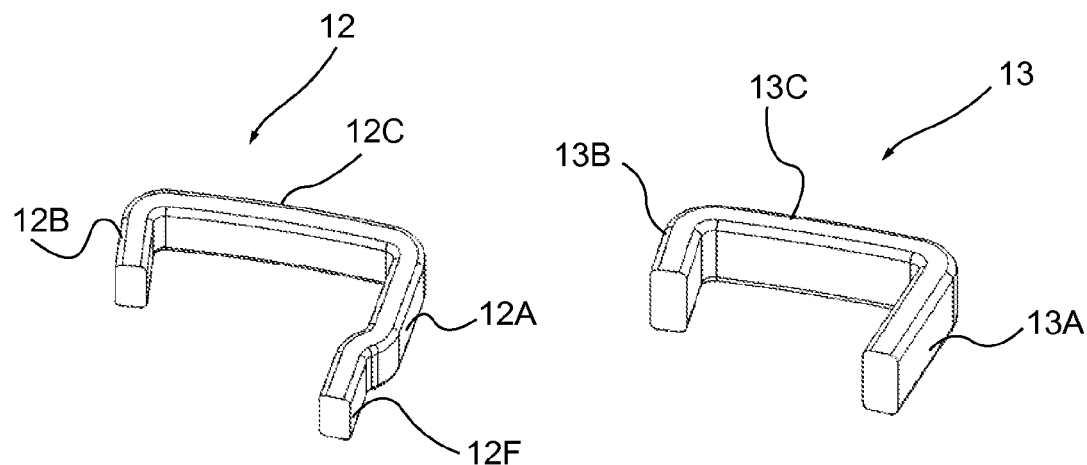
FIG. 5 is a perspective view of one embodiment of a first type of special bridge or jumper conductor.
FIG. 6 is a perspective view of a further embodiment of the first type of jumper in FIG. 5.

With reference to FIGS. 5 and 6, the jumpers of the first type 12, 13 each comprise a first leg of jumpers 12A, 13A, a second leg of jumpers 12B, 13B and a connecting portion of jumper 12C, 13C between the respective legs of jumpers 12A, 12B and 13A, 13B.

According to one embodiment, the jumpers of the first type may include a plurality of jumpers having different conformations. In particular, as can be seen in the figures, in the example, the jumpers 12 differ from jumpers 13 essentially in the shape of the respective legs.

According to a preferred embodiment each jumper of the first type 12, 13 has the first leg of jumpers 12A, 13A connected to a free end portion 11F belonging to one chosen between the second and the third layer L2, L3 and has the second leg of jumpers 12B, 13B connected to a free end portion 11F belonging to the other between the second and the third layer L2, L3. As can be seen in FIGS. 2 and 3, in the example the first and the second leg of jumpers 12A, 13A, and 12B, 13B of each jumper 12, 13 are connected respectively to a free end portion 11F of the third layer L3 and to a free end portion 11F of the second layer L2. More particularly, as can be seen for example in FIGS. 2 and 3, each jumper of the first type 12, 13 has the first leg of jumpers 12A, 13A and the second leg of jumpers 12B, 13B which are extended each in their respective passage defined in the above-mentioned conductor layers L1-L4 to connect to the respective free end portions 11F. As can be seen for example in FIG. 3, each of these passages extends in a radial or a substantially radial direction between the layers of conductors L1-L4. Furthermore, the joining portion of jumpers 12C, 13C of each of the jumpers 12, 13 is extended radially externally with respect to the radially outer ends layer L1 to pass around a group of free end portions of 11F. As can be seen for example in FIG. 3, according to one embodiment of the first leg of jumpers 12A, 13A and the second leg of jumpers 12B, 13B of each jumper 12, 13 extend in a prevailingly radial or essentially radial direction. More generally it can be sufficient for at least one between the first leg of each jumper 12A, 13A and the second leg of jumpers 12B, 13B of each jumper 12, 13 to extend in a prevailingly radial or essentially radial direction so as to pass through one or more of the layers L1-L4. Also, the connecting portions 12C, 13C of each jumper 12, 13 preferably extend in a prevalently circumferential or essentially circumferential direction.

As can be seen from FIGS. 2 and 3, according to a preferred embodiment, each jumper 12, 13 is arranged so as to go around a group of free end portions 11F which are bent at the said first pitch and which are arranged consecutively and circumferentially adjacent to each other. Furthermore, each pair of legs of jumpers 12A, 12B and 13A, 13B of each jumper 12, 13 is connected to a respective pair of free end portions 11F which are bent at the said second pitch.

According to a preferred embodiment each jumper 12, in addition to going around the aforementioned group of end portions bent at the first pitch, also goes around an end portion of the phase terminal 17F which protrudes from the welding face 4 of the stator when the phase terminal 17 is inserted in the slots 5 of the stator. In this case at least one of the legs of jumpers 12A, 12B preferably presents an end portion of leg jumper 12F (FIG. 5) that is bent to pass around the end portion 17F of the phase terminal 17 and to connect to the respective free end portion 11F.

Note that in this example each of the layers of conductors L1-L4 includes at least one group of free end portions 11F that are bent at the first pitch and which are arranged in succession and circumferentially adjacent to each other (such a group is formed for example by two circumferentially adjacent free end portions 11F). However, according to a preferred embodiment, it is enough for at least one of the layers L1-L4 to include a group of free end portions 11F bent at the said first pitch and which are arranged consecutively and circumferentially adjacent to each other. In the latter case, this group of end portions belongs preferably to the radially outer ends layer L1.

Also, it should be noted that although in the example each jumper 12, 13 is arranged so as to go around a group of free end portions 11F, in general it is sufficient for each jumper 12, 13 to go around at least one of the free end portions 11F belonging to the radially outer ends layer L1.

Also note that in accordance with further embodiments the legs of jumpers 12A, 12B and 13A, 13B could connect free end portions 11F belonging to different conductor layers than the layers L2, L3 as described above. For example the legs of each jumper 12, 13 could connect free end portions 11F of the first and fourth layers L1, L4, or the first and third layers L1, L3. Therefore, it is in general not strictly necessary for both legs of jumpers 12A, 12B and 13A, 13B of each jumper 12, 13 to be extended in a respective passage defined in the layers L1-L4. In other words, it is generally sufficient that at least one of the legs of jumpers 12A, 12B and 13A, 13B of each jumper 12, 13 is extended in a respective passage defined in the layers L1-L4 to connect to the respective free end portion 11F.

Figures 7, 8:
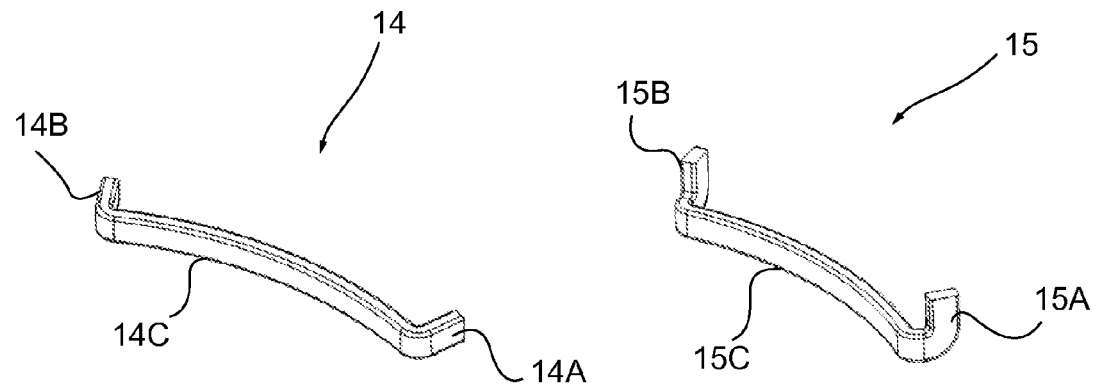
FIG. 7 is a perspective view of one embodiment of a second type of special bridge or jumper conductor.
FIG. 8 is a perspective view of a further embodiment of the second type of jumper type in FIG. 7.

Referring now to FIGS. 7 and 8, these figures show two embodiments of jumpers of said second type 14, 15. In particular, according to an embodiment of the jumpers of the second type 14, 15, each comprise two legs of jumpers, respectively 14A, 14B and 15A, 15B, and a connecting portion of jumper 14C, 15C between the respective legs of jumpers. In the example the jumpers of the second type 14, 15 each have different conformations. In particular, as can be seen in FIGS. 7 and 8, in the example the jumpers 14 differ from the jumpers 15 essentially in the shape of the respective legs.

Returning to FIGS. 2 and 3, it can be observed that the jumpers of the second type 14, 15 are arranged on one side of the bar winding 10 which is radially opposite to that of the jumpers of the first type 12, 13. In other words, in this example the jumpers 12, 13 are arranged radially externally while jumpers 14, 15 are arranged radially internally with respect to jumpers 12, 13. However, according to one embodiment, the positions of the jumpers 12, 13 and of jumpers 14, 15 can also be reversed from those shown in the figures. In other words, jumpers 12, 13 may be arranged radially internally and jumpers 14, 15 can be arranged radially externally with respect to the jumpers 12, 13. In this case, it is evident that the jumpers 12 and 13 are arranged so as to go around at least one free end portion 11F of the radially inner ends layer L4 instead of going around at least one free end portion 11F of the radially out end layer L1 as described above.

According to one embodiment each jumper of the second type 14, 15 has its respective legs 14A, 14B and 15A, 15B connected respectively to two free end portions of the radially inner layer L4. In particular, according to one embodiment, the jumpers 14, 15 connect free end portions 11F between them, bent at the above mentioned first pitch. In the example the connecting portions of jumper 14C, 15C are extended in a radially inner direction with respect to the radially inner ends layers L4. In particular, as can be observed in FIGS. 2 and 3, according to one embodiment, jumpers 14 and 15 are arranged crossed over each other. In this case, the jumpers 15 are arranged in such a way as to have a respective leg of jumper which is interposed between the connecting portion 14C of jumper 14 and the radially inner ends layer L4 to connect to the respective free end portion 11F. Additionally the connecting portions 14C, 15C of the jumpers 14, 15 are preferably partially overlapping each other. According to a preferred embodiment, to allow a crossed arrangement of the jumpers 14, 15, the jumpers 15 comprise at least one leg of an essentially L-shaped jumper, which extends in a plane of the sheaf of planes passing through the stator axis Z-Z.

According to the above description, it is easy to understand how a stator for an electric machine according to this description is capable of achieving the above objectives.

Indeed, owing to the fact that at least one jumper of a first type which has two legs of jumper connected to the free end portions of two circular conductor layers distinct between them is provided, where said jumper passes around at least one free end portion of the radially outer ends layer (or passes around at least one free end portion of the radially inner ends layer) and has at least one leg that is extended into a passage defined in the conductor layers, it is possible to make the connections between free end portions belonging in distinct conductor layers without said jumper protruding axially beyond the free end portions of the basic conductors. In this way it is therefore possible to make the design and management of the bar winding connections more flexible while preserving the axial compactness of the parts of the bar winding that protrude axially from the stator core.

Without prejudice to the principle of the invention, the forms of embodiment and details of construction can be varied widely with respect to what has been described and has been illustrated purely by way of non-limiting example, without thereby departing from the scope of the invention as defined in the appended claims.

The invention claimed is:
1. Stator for an electric machine which comprises:
   a stator core having a first and a second face opposite to each other and a circular array of stator slots extended between said faces and distributed around a stator axis; and
   a bar winding comprising a plurality of basic conductors and a plurality of special conductors which are interconnected to form the bar winding;
   wherein the basic conductors each comprise two basic conductor legs and a basic conductor connecting portion between said legs, each leg of basic conductor having an end portion connected to the basic conductor connecting portion and an opposite free end portion;
   wherein the basic conductors are inserted into the stator slots with free end portions projecting from said second face, the free end portions defining a plurality of circular conductor layers concentric to one another comprising a circular layer of radially outer ends and a circular layer of radially inner ends, and
   wherein the special conductors include a jumper of a first type having a first and a second leg of jumpers connected respectively to two of said free end portions and one jumper connection portion between said legs of jumpers, the jumper connection portion being extended radially outward with respect to said radially outer end layer, or radially inward with respect to said radially inner end layer, to pass around at least one of the free end portions respectively of the radially outer end layer or the radially inner end layer, and,
   wherein the jumper of said first type is arranged in such a way that:
   the two free end portions to which the first and the second jumper leg are connected belong respectively to two of said conductor layers, each distinct;
   at least one of the first and second legs of jumpers extends in a respective passage defined in said conductor layers to connect to the respective free end portion; and
   wherein said conductor layers include a first set of free end portions bent circumferentially at a first pitch and a second set of free end portions bent circumferentially at a second pitch, different from the first pitch, and wherein at least one of said conductor layers comprises a group of free end portions bent at said first pitch which are arranged in succession and circumferentially adjacent to one another; the jumper of said first type going around said group of free end portions, and said free end portions to which the first and the second leg of jumpers are connected, being bent at said second pitch.

2. Stator according to claim 1, wherein the other one between the first and second leg of jumpers extends in a respective passage defined in said conductor layers to connect to the respective free end portion.

3. Stator according to claim 2, wherein said layers of conductors comprise, in succession and starting from said radially outer end layer up to said radially inner end layer, a first, a second, a third, and a fourth circular conductor layer, and in which the free end portion which is connected to the first leg of jumpers belongs to one of said second and third layers and the free end portion to which the second leg of jumpers is connected belongs to the other between said second and third layers.

4. Stator according to claim 1, wherein the special conductors further comprise a phase terminal inserted in said slots of the stator and having a phase terminal end portion that protrudes form the second face of the stator, the jumper of the first type also going around the phase terminal end portion, and at least one of the first and the second leg of jumpers having a respective end portion of leg of jumpers that is bent to pass around said phase terminal end portion and to connect to the respective free end portion.

5. Stator according to any one of claim 1-3 or 4, comprising a plurality of jumpers of said first type.

6. Stator according to any one of claim 1-3 or 4, in which the special conductors comprise a plurality of jumpers of a second type which are arranged on one side of the bar winding which is radially opposite to that of the jumper of the first type,
   wherein each jumper of the second type has two legs of jumpers and a connecting portion of jumpers between said legs of jumpers, the two legs of jumpers of each jumper of the second type being connected respectively to two of said free end portions that belong to a same layer of said plurality layers, and
   in which the jumpers of the second type of said plurality are arranged across each other.

7. An electric machine comprising a stator as defined in any of claim 1-3 or 4.

8. Electric or hybrid vehicle comprising a stator as defined in any one of claim 1-3 or 4.

* * * * *